United States Patent [19]

Nakanishi et al.

[11] Patent Number: 5,066,975

[45] Date of Patent: Nov. 19, 1991

[54] SYSTEM FOR CONTROLLING MOVEMENT OF A DOCUMENT TABLE IN A COPYING APPARATUS

[75] Inventors: Yasushi Nakanishi, Yamatokoriyama; Takahiro Fukunaga, Nara, both of Japan

[73] Assignee: Sharp Kabushiki Kaisha, Osaka, Japan

[21] Appl. No.: 353,045

[22] Filed: May 17, 1989

[30] Foreign Application Priority Data

May 31, 1988 [JP] Japan .................................. 63-135320

[51] Int. Cl.$^5$ ............................................. G03G 21/00
[52] U.S. Cl. ...................................... 355/200; 355/75; 355/230
[58] Field of Search ................. 355/75, 230, 231, 200, 355/210

[56] References Cited

U.S. PATENT DOCUMENTS

| | | | |
|---|---|---|---|
| 4,027,965 | 6/1977 | Mikasa et al. | 354/234 X |
| 4,635,010 | 1/1987 | Miyai et al. | 355/200 |
| 4,764,788 | 8/1988 | Watashi et al. | 355/231 |
| 4,857,956 | 8/1989 | Honda | 355/234 |

Primary Examiner—Fred L. Braun
Attorney, Agent, or Firm—Birch, Stewart, Kolasch & Birch

[57] ABSTRACT

A portable copying apparatus of the type in which a document table is movably disposed thereon is generally provided with a lock member for locking the document table and a system for controlling movement of the document table. The lock member is disposed on one side of the apparatus perpendicular to the direction of movement of the document table. The control system contains a plurality of timers so that the document table may move in a direction in which the document table is released from the lock member and further move to its start position.

4 Claims, 5 Drawing Sheets

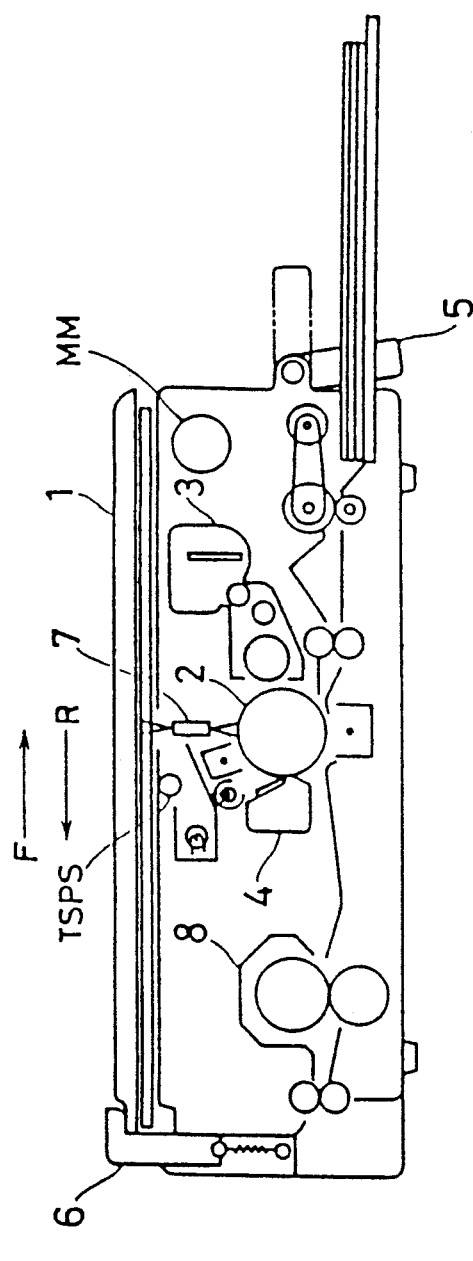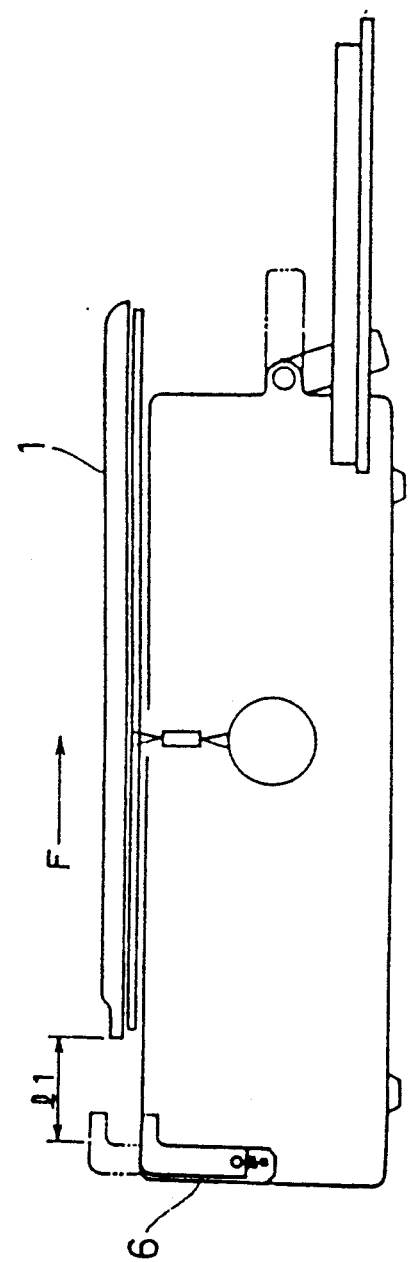
Fig. 2a
Fig. 2b

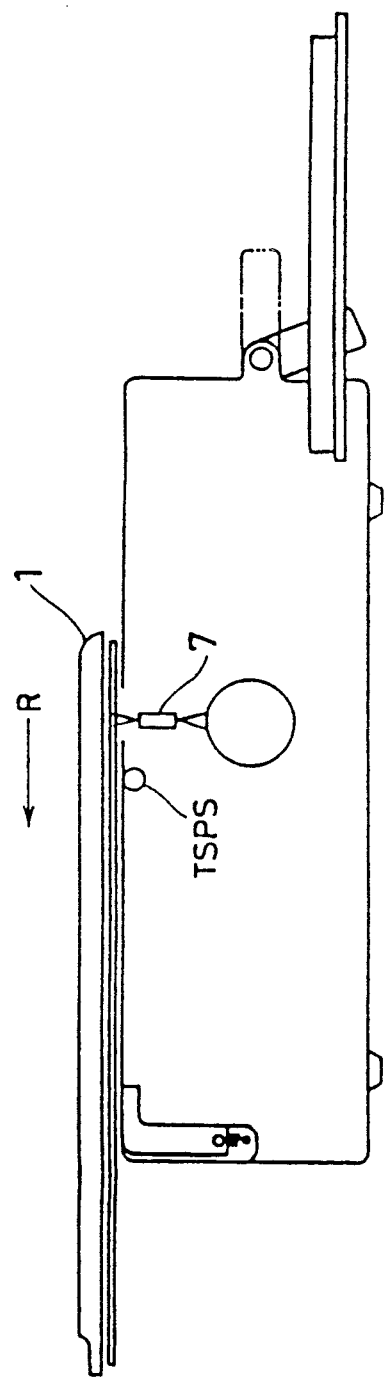
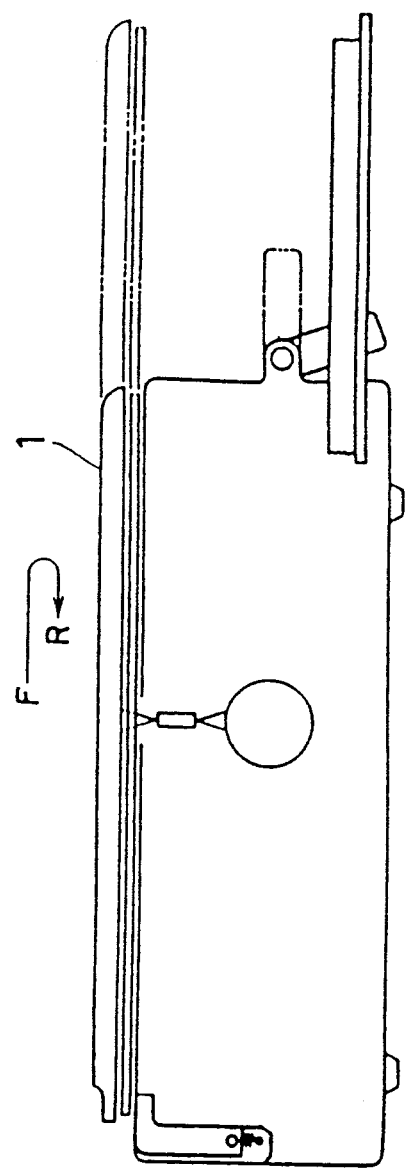

SYSTEM FOR CONTROLLING MOVEMENT OF A DOCUMENT TABLE IN A COPYING APPARATUS

BACKGROUND OF THE INVENTION

1. Field of the Invention

The present invention generally relates to a system for controlling movement of a document table in a copying apparatus of the type in which the document table is movably disposed thereon, and more particularly, to the improvement of control at the beginning of copying operation.

2. Description of the Prior Art

Recently, a portable electrophotographic copying apparatus came to be known. The portable copying apparatus is generally formed with a moving document table so that any space may be effectively utilized. Accordingly, such an apparatus is provided with a lock mechanism for locking the document table to prevent damage thereto when being carried. The Japanese Patent Laid-Open Application No. 61-65228 discloses one of the portable copying apparatuses.

FIG. 1 is a schematic view of a moving document table type copying apparatus having a lock mechanism. This apparatus is provided with a document table 1 on its upper surface and a photosensitive member 2 in the form of a drum substantially at a central portion within its housing. The document table 1 is movable in the direction shown by arrows F and R. The apparatus accommodates a developing device 3 on the right side of the photosensitive member 2 and a cleaning device 4 on the left side thereof, as viewed in FIG. 1. The apparatus is further provided with a handle 5 on its right side and a hooked lock member 6 on its left side, as viewed in FIG. 1.

When the document table 1 is locked, it is necessary to initially lift up the lock member 6 against the biasing force of a compression spring while manually slightly moving the document table 1 in the direction of the arrow F. Thereafter, the document table 1 is securely locked by engaging it with the lock member 6 while moving it in the direction of the arrow R. Under such conditions, the document table 1 would never slip off the apparatus housing even when the apparatus is lifted up.

When the lock of the document table 1 is released, the document table 1 is manually slightly moved in the direction of the arrow F. In this event, engagement between the document table 1 and the lock member 6 is released and the lock member 6 is drawn into the apparatus housing by virtue of the biasing force of the spring.

On the other hand, when a document placed on the document table 1 is copied, it is scanned from its right end. Because of this, the document table 1 initially moves in the direction of the arrow R until its right end reaches a start position at which the right end is located above a bundled optical fiber 7. However, if an operator starts the copying operation without unlocking the document table 1 after the transportation of the apparatus, movement of the document table 1 in the direction of the arrow R exerts excessive force upon the lock member 6, occasionally damaging the lock member 6, the document table 1 or its drive system.

SUMMARY OF THE INVENTION

Accordingly, the present invention has been developed with a view to substantially eliminating the above described disadvantage inherent in the prior art system for controlling movement of a document table in a copying apparatus, and has for its essential object to provide an improved system which is capable of preventing damage to a lock member, a document table or its drive system by automatically releasing the locked condition of the document table.

In accomplishing this and other objects, the system according to one preferred embodiment of the present invention is applied to a copying apparatus provided with a movable document table and a lock member disposed on one side of the apparatus perpendicular to the direction of movement of the document table for locking the document table, and is characterized by means for moving the document table in a direction in which the document table is released from the lock member and for further moving the document table to its start position.

In the system according to the present invention, the document table is caused to initially move away from the lock member in the direction for releasing its lock. Thereafter, the document table is caused to move to its start position so that the copying operation may be performed. Accordingly, it is not necessary for an operator to manually unlock the document table.

BRIEF DESCRIPTION OF THE DRAWINGS

This and other objects and features of the present invention will become more apparent from the following description taken in conjunction with the preferred embodiment thereof with, reference to the accompanying drawings, throughout with like parts being designated by like reference numerals, and wherein;

FIG. 2a is a schematic view of a copying apparatus provided with a system for controlling movement of a document table according to the present invention;

FIGS. 2b to 2d are schematic views of the principal portions of FIG. 2a, with the document table being positioned at different locations;

FIG. 3 is a block diagram of the copying apparatus of FIG. 2a; and

FIG. 4 is a combination of FIGS. 4a and 4b, respectively, which are flow-charts indicative of a procedure employed in the copying apparatus of FIG. 2a.

DETAILED DESCRIPTION OF THE PREFERRED EMBODIMENTS

FIG. 2a schematically depicts a copying apparatus provided with a system for controlling movement of a document table 1 according to the present invention.

FIGS. 2b to 2d depict the principal portions of the copying apparatus, with the document table 1 being positioned at different locations during the copying operation.

Figure 1:
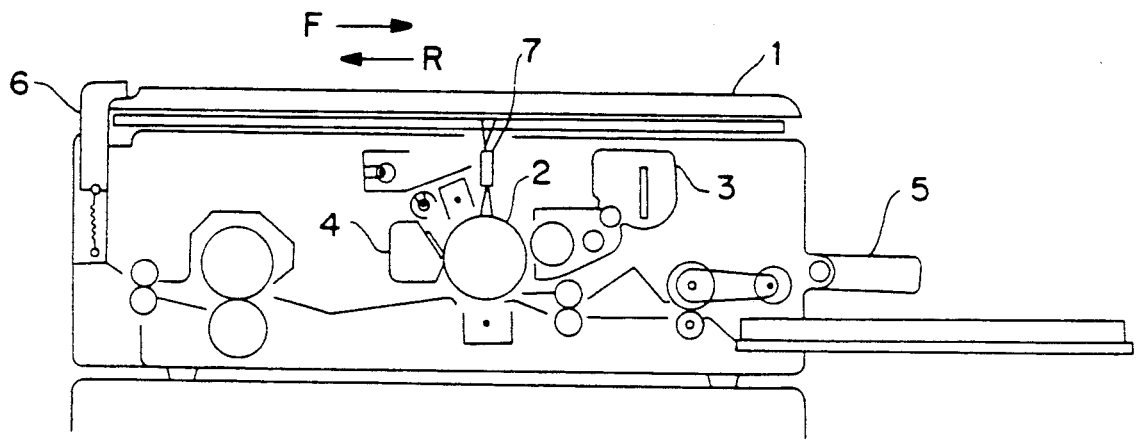
FIG. 1 is a schematic view of a conventional copying apparatus.

In FIG. 2a, the same parts as those of the copying apparatus of FIG. 1 are designated by the same reference numerals and the description thereof are omitted.

The copying apparatus accommodates a main motor MM at an upper right portion inside its housing, as viewed in FIG. 2a. The main motor MM drives a photosensitive member 2, a magnetic roller of a developing device 3, a heat roller of a fixing device 8, the document table 1 and the like. A driving force transmitting system for the document table 1 contains a table feed solenoid TFS and a table return solenoid TRS. When the table feed solenoid is turned on, the document table 1 moves in the direction of the arrow F. On the other hand, when the table return solenoid is turned on, the document table 1 moves in the direction of the arrow R. A table start position detector sensor TSPS is provided on a rear upper surface substantially at the central portion of the apparatus housing and an operating portion including a print switch and the like is provided o a front upper surface of the apparatus housing, as viewed in FIG. 2a.

Figure 3:
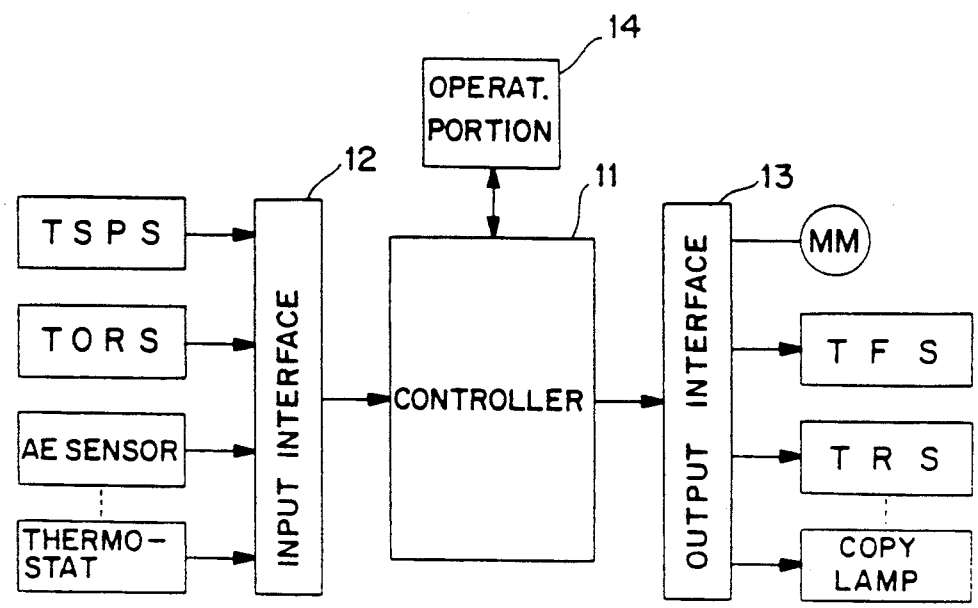

FIG. 3 is a block diagram of the copying apparatus to which the present invention is applied.

In the diagram of FIG. 3, the entire control of the apparatus is performed by a controller 11 into which signals from various sensors are inputted through an input interface 12. The sensors coupled with the input interface 12 are the table start position detector sensor TSPS, a table overrun detector sensor TORS for detecting whether or not the document table 1 overruns a position up to which the document table 1 is permitted to travel in the direction of feed of documents as shown by the arrow F, an AE sensor for detecting the density of documents, and a thermostat for detecting overheating of the fixing device 8. The controller 11 controls various process portions through an output interface 13 so that voltage control and the like for a copy lamp, as well as those of the main motor, the table feed solenoid and the table return solenoid, may be performed in compliance with the input from the AE sensor. Furthermore, the controller 11 exchanges data with an operating portion 14.

Figure 4A:
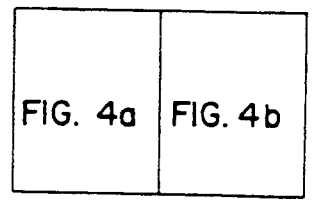
Figure 4A:
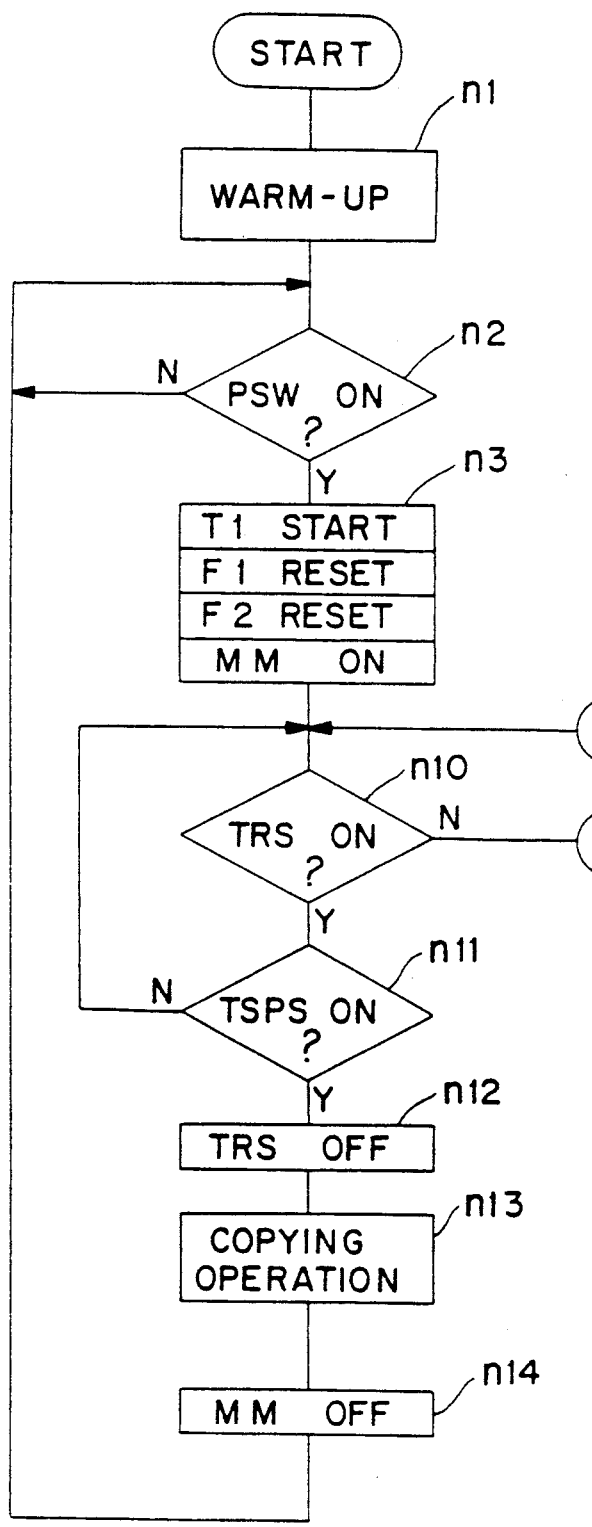
Figure 4B:
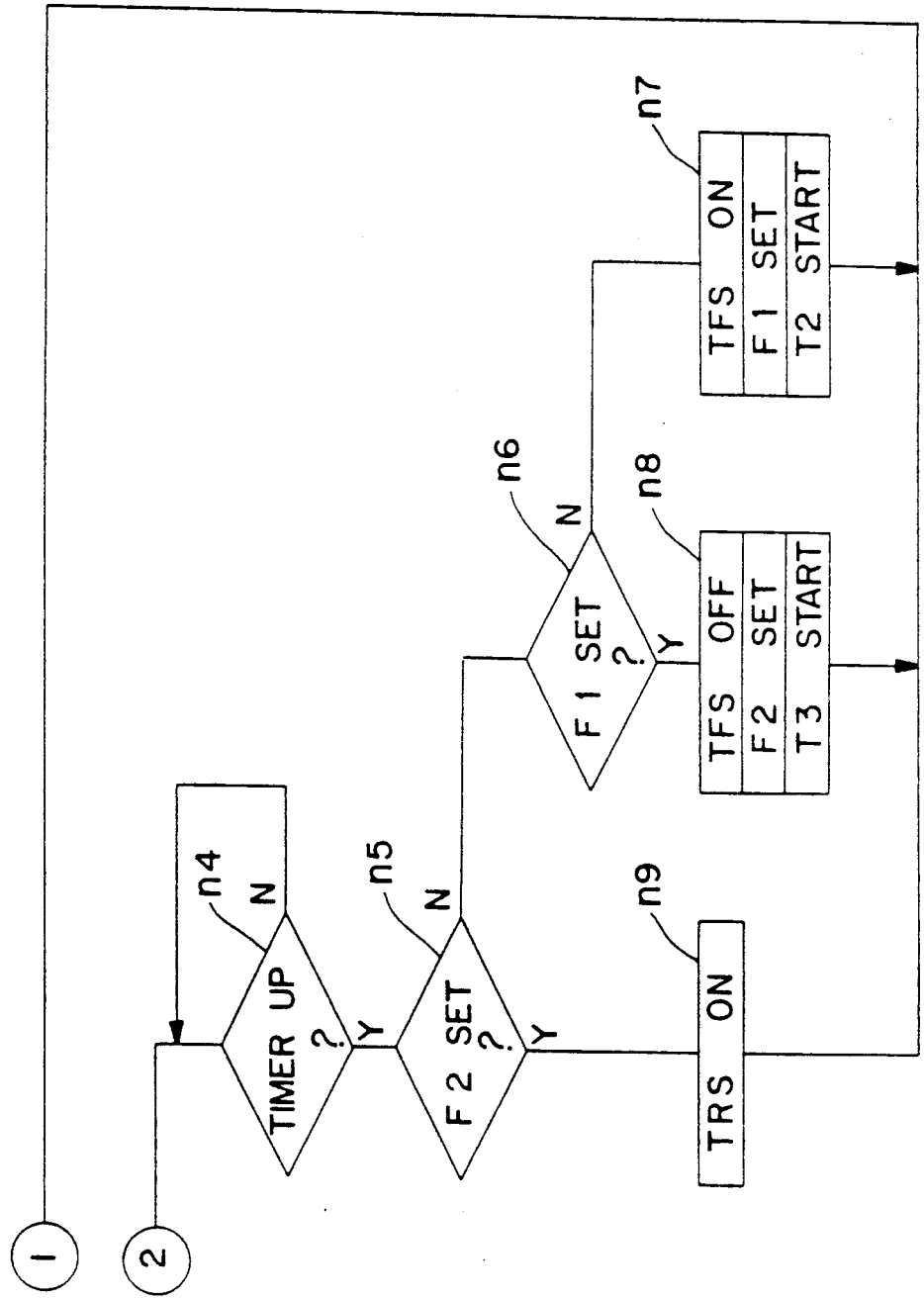

FIG. 4 is a flow-chart indicative of procedure to be processed in the copying apparatus according to the present invention.

The document table 1 is usually locked by the lock member 6 prior to the use of the copying apparatus, as shown in FIG. 2a.

When the apparatus is powered on, the developing device 3, the fixing device 8 and the like are initially warmed up at step n1. Upon completion of warm-up, when the print switch on the operating portion 14 is turned on at step n2, the procedure enters a lock release process for releasing the lock member 6 which locks the document table 1. A timer T1 is started at step n3 to turn on the main motor MM by resetting flags F1 and F2. The timer T1 checks time until a drive system is stabilized and is up upon the lapse of, for example, approximately 0.2 second. The flags F1 and F2 are set when the document table 1 moves in the direction of the arrows F and R, respectively, at the time of lock release.

After the timer T1 is up at step n4, set conditions of the flags F2 and F1 are judged at steps n5 and n6, respectively. In this event, since both the flags F1 and F2 have been reset at step n3, the procedure proceeds to step n7 at which the table feed solenoid is turned on so that the document table 1 may be caused to move in the direction of the arrow F. Furthermore, the flag F1 is set and a timer T2 is caused to start at this step. The timer T2 checks time, for example approximately 1 second, required for the lock release which is done by moving the document table 1 in the direction of the arrow F. When the timer T2 is up at step n4, the procedure proceeds to step n8 because the flag F1 has already been set. At step n8, the table feed solenoid is turned off and the flag F2 is set. Simultaneously, a timer T3 is caused to start which checks downtime, for example approximately 0.5 second, during which the direction of movement of the document table 1 is changed from its feed movement to its return movement.

FIG. 2b shows the position of the document table 1 at the time the timer T2 is up. As shown in this figure, the document table 1 travels a length of l1 until the timer T2 is up. In this event, the document table 1 is disengaged from the lock member 6, which is then drawn into the apparatus housing by virtue of biasing force of the spring, thereby releasing the lock of the document table 1.

When the timer T3 is up at step n4, the table return solenoid is turned on at step n9 because the flag F2 has already been set, thereby rendering the document table 1 to move in the direction of the arrow R. In this event, since the document table 1 is released from the lock member 6, the document table 1, the lock member 6 and the drive system for the document table 1 would never be subjected to any damage. Subsequently, it is judged at step n10 whether or not the table return solenoid is on. Since the table return solenoid has been turned on at step n9, the procedure proceeds to step n11 at which it is judged whether or not the table start position detector sensor is on. This sensor is turned on by the movement of the document table 1 in the direction of the arrow R. As a result, the table return solenoid is turned off at step n12. As shown in FIG. 2c, when the right end of the document table 1 reaches a position where the bundled optical fiber 7 is located, that is, when the document table 1 is set at its start position, the table start position detector sensor is turned on.

Upon movement of the document table 1 in the direction of the arrow F from its start position, the copying operation is initiated. When the document table 1 moves in the direction of the arrow F, the copy lamp is illuminated and reflected light therefrom is applied to the photosensitive member 2 through the bundled optical fiber 7. Thereafter, the copy lamp is turned off and the document table 1 moves in the direction of the arrow R as far as its home position at step n13, as shown in FIG. 2d. Upon completion of the copying operation, the main motor MM is turned off at step n14 and the system is brought into a stand-by condition.

The system according to the present invention is particularly characterized by steps n3 to n12 during which the document table is caused to move in the direction for releasing its lock member and further to move to its start position.

It is noted that although the handle is disposed on a side opposite to the lock member in this embodiment, hooked portions for carrying the apparatus may be provided at any suitable positions on upper and lower surfaces of the apparatus housing.

As described above, according to the present invention, the document table initially moves in the direction for releasing its lock before it reaches its start position. Accordingly, the document table and its drive system would never be damaged by the lock member, and also, the lock member itself would never be damaged, thus protecting the copying apparatus from any possible damage due to an operator's careless operation.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An improved system for controlling movement of a document table in a copying apparatus which is provided with a print switch, a movable document table and a lock member for locking said document table, said lock member being disposed on one side of the apparatus perpendicular to a direction of movement of the document table, wherein the improvement comprises:

means for moving the document table in a direction in which said document table is released from said lock member so that upon operation of said print switch, said document table initially moves to automatically disengages said document table from said lock member, said means further moving said document able to a start position from which the apparatus can start a copying operation.

2. The system according to claim 1, wherein said means comprises a first timer for checking time until a drive system for the document table is stabilized, a second timer for checking time required for lock release and a third timer for checking downtime during which the document table is changed in direction of its movement.

3. A system for controlling movement of a movable document table of a copying apparatus comprising a print switch, a lock member for selectively preventing movement of the document table, said lock member having a first portion and a second portion, said first portion being disposed generally perpendicular to said second portion, said first portion being disposed on one side of the apparatus and being movable perpendicular to the direction of movement of the movable document table, said second portion overlaying the document table when said locking member is in a locked position, and means for moving the document table in a direction in which the document table is released from said lock member upon operation of said print switch so that the document table initially moves to automatically disengage the document table from said lock member and for further moving the document table to a start position from which the apparatus can start a copying operation.

4. The system according to claim 3, wherein said means comprises a first timer for checking time until a drive system for the document table is stabilized, a second timer for checking time required for lock release and a third timer for checking downtime during which the document table is changed in direction of its movement.

* * * * *